(12) United States Patent
Narusawa et al.

(10) Patent No.: US 6,947,171 B1
(45) Date of Patent: *Sep. 20, 2005

(54) MULTIFUNCTION PRINTER, COMPUTER, PRINTING SYSTEM AND RECORDING MEDIUM

(75) Inventors: Hideyuki Narusawa, Nagano-Ken (JP); Masakatsu Endo, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 816 days.

This patent is subject to a terminal disclaimer.

(21) Appl. No.: 09/670,722

(22) Filed: Sep. 28, 2000

(30) Foreign Application Priority Data

Oct. 1, 1999 (JP) ................................. 11-281465
Oct. 1, 1999 (JP) ................................. 11-281854

(51) Int. Cl.[7] ........................................... G06K 15/00
(52) U.S. Cl. ..................................... 358/1.6; 358/1.13
(58) Field of Search ........................... 358/1.15, 1.16, 358/1.6, 1.13; 709/220, 221

(56) References Cited

U.S. PATENT DOCUMENTS

| | | | | |
|---|---|---|---|---|
| 6,134,021 A | * | 10/2000 | Silverbrook | 358/1.18 |
| 6,141,111 A | * | 10/2000 | Kato | 358/1.15 |
| 6,498,658 B1 | * | 12/2002 | Sekikawa | 358/1.16 |
| 6,546,419 B1 | * | 4/2003 | Humpleman et al. | 709/223 |

FOREIGN PATENT DOCUMENTS

JP  10-198626  7/1998

* cited by examiner

*Primary Examiner*—Arthur G. Evans
(74) *Attorney, Agent, or Firm*—Sughrue Mion, PLLC

(57) ABSTRACT

Multifunction printers (20, 30) each holding a card reader (26, 36) and a printer (24, 34) in a common housing are connected to a host computer (10) via USB hubs (22, 32). Then, the host computer 10 can recognize the card readers (26, 36) and the printers (24, 34) as independent devices from one another. Therefore, the host computer (10) can utilize the card readers (26, 36) and the printers (24, 34) as independent devices, respectively.

37 Claims, 13 Drawing Sheets

| SERIAL NUMBER | 1234567 |
|---|---|
| DRIVE ID | F: |
| CARD INSERTED | YES |

} CARD READER 26

TB1

| SERIAL NUMBER | 7654321 |
|---|---|
| DRIVE ID | G: |
| CARD INSERTED | NO |

} CARD READER 36

TB2

MULTIFUNCTION PRINTER, COMPUTER, PRINTING SYSTEM AND RECORDING MEDIUM

BACKGROUND OF THE INVENTION

1. Field of the Invention

This invention relates to a multifunction printer containing a data acquiring device and a printing device in a single housing.

2. Description of the Related Background Art

FIGS. 16 and 17 are diagrams illustrating a conventional multifunction printer. As shown in FIG. 16, the multifunction printer 100 includes a card reader 102 for acquiring image data from a PC memory card and a printer 104 for printing the image data. The printer 104 of the multifunction printer 100 is connected to a host computer 110 by a RS-232C cable or a local bus cable. The card reader 102 and the printer 104 are connected together by an internal bus via an image processor 106.

In some cases, the card reader 102 of the multifunction printer is connected to the host computer 110 by a RS-232C cable or a local bus cable as shown in FIG. 17. Also under this configuration, the card reader 102 and the printer 104 are connected together by the internal bus via the image processor 106.

Typical operations of the multifunction printer shown in FIGS. 16 and 17 are explained below. An ordinary user stores original image data taken through a digital camera, for example, in a PC memory card. Then, he or she sets this PC memory card to the card reader 102 to have it read out the original image data. The image processor 106 takes in the original image data read out from the PC memory card, and executes image processing. More specifically, original image data of RGB (red, green and blue) multi-values is converted into print image data of YMC (yellow, magenta, cyan) multi-values. Upon color conversion from the RGB system to the YMC system, the image processor 106 simultaneously conducts reduction of multi-values, that is, reduction of the number of tones of pixels represented by multi-level tones. Then, the image processor 106 transmits the print image data to the printer 104. The printer 104 performs printing on the basis of the print image data.

The multifunction printer 100 shown in FIGS. 16 and 17, however, involved the problem of a high manufacturing cost because it includes the image processor 106. That is, since the image processor 106 needs an arithmetic operation device for color conversion and reduction of multi-values.

There was another problem that, as shown in FIGS. 16 and 17, the host computer 110 could recognize only one of the card reader 102 and the printer 104 of the multifunction printer 100. That is, in the multifunction printer 100 shown in FIG. 16, the host computer 110 could recognize the printer 104 but not the card reader 102 independently. Therefore, the host computer 110 could not read and use data stored in the PC memory card from the card reader 102.

On the other hand, in the multifunction printer 100 shown in FIG. 17, the host computer 110 could recognize the card reader 102 but not the printer 104 independently. Therefore, the host computer 110 could not transmit printing data from the host computer 110 and could not have it printed by the printer 104.

That is, in any of the multifunction printers 100 shown in FIGS. 16 and 17, the host computer 110 could not fully utilize both the card reader 102 and the printer 104 equipped in the multifunction printer 100.

Furthermore, in case that a plurality of multifunction printers 100A, 100B were connected to a single computer 110 as shown in FIG. 18, a user might erroneously activate the printer 104 of the multifunction printer 100B to print image data read out by the card reader 102 of the multifunction printer 100A. That is, the user might have the multifunction printer 100B, which he or she did not intend to use, print the image.

SUMMARY OF THE INVENTION

It is therefore an object of the invention to provide a multifunction printer whose card reader and printer can be fully utilized by a host computer. Another object of the invention is to provide a printing system capable of efficiently using such a printing machine when it is connected to the host computer. Another object of the invention is to prevent an image from being printed by a wrong multifunction printer a user does not intend to use in the case where a plurality of multifunction printers are connected to a single computer.

In order to accomplish the aforementioned and other objects, according to one aspect of the present invention, a multifunction printer comprising:

a data acquiring device for acquiring original image data and being recognizable as an independent device by a computer to which the data acquiring device is connected; and a printing machine for printing print image data generated by image processing of the original image data and being recognizable as an independent device by a computer to which the printing machine is connected, the data acquiring device and the printing device being held in a common housing.

According to another aspect of the invention, a computer to which a multifunction printer holding a data acquiring device for acquiring image data and a printing device for printing the image data in a common housing, and capable of recognizing the data acquiring device and the printing device independently, comprising:

a data acquiring device control section for controlling the data acquiring device and for acquiring original image data from the data acquiring device;

a print image data generating section for acquiring and processing the original image data from the data acquiring device control section, and for generating print image data which the printing device can print; and a printing device control section for controlling the printing device, then acquiring the print image data from the print image data generating section and transmitting the print image data to the printing device.

According to a further aspect of the invention, a computer to which a multifunction printer is connected, the multifunction printer holding a data acquiring device for acquiring image data and a printing device for printing the image data in a common housing, the multifunction printer holding identification information indicating that the data acquiring device and the printing device are held in a common housing, the computer being capable of recognizing the data acquiring device and the printing device independently, comprising:

a data acquiring device identification information acquiring section that acquires, from the data acquiring device, data acquiring identification information enabling distinction of the data acquiring device from other such data acquiring devices;

a printing machine identification information acquiring section that acquires, from the printing machine, printing device identification information enabling distinction of the printing device from other such printing devices; and a comparing section that compares the data acquiring device identification information with the printing device identification information to judge whether the both devices are held in a common housing or not.

According to a still further aspect of the invention, a computer to which a multifunction printer is connected, the multifunction printer holding a storage medium read/write device for reading image data from a storage medium and writing image data on the storage medium and a printing device for printing the image data in a common housing, the computer being capable of recognizing the data acquiring device and the printing device independently, comprising:

a storage medium read/write device control section that controls the storage medium read/write device and acquires original image data from the storage medium read/write device, the storage medium read/write device control section having a dual-use mode permitting reading of image data from the storage medium and writing of image data onto the storage medium and a read-only mode permitting only reading of image data from the storage medium;

a print image data generating section that acquires the original image data from the storage medium read/write device control section, and generates print image data that can be printed by the printing device by executing image processing of the image data; and a printing device control section that controls the printing device, and acquires the print image data from the print image data generating section and transmits the print image data to the printing device.

According to another aspect of the invention, a printing system comprising:

a data acquiring device for acquiring original image data;

a computer that acquires the original image data from the data acquiring device and generates print image data by image processing of the original image; and a printing device that receives the print image data from the computer and prints the print image data, the computer being capable of recognizing the data acquiring device and the printing device as independent devices, the data acquiring device and the printing device being held in a common housing.

According to a further aspect of the invention, a recording medium that can be read by a computer to which a multifunction printer having a data acquiring device for acquiring image data and a printing device for printing image data held in a common housing is connected, the computer recognizing the data acquiring device and the printing device independently, a program stored in the recording medium comprising the steps of:

acquiring original image data from the data acquiring device;

executing image processing of the image data and thereby generating print image data that can be printed by the printing device; and transmitting the print image data to the printing device.

According to a still further aspect of the invention, a recording medium that can be read by a computer to which a multifunction printer is connected, the multifunction printer having a data acquiring device for acquiring image data and a printing device for printing image data both held in a common housing, the multifunction printer holding identification information indicating that the data acquiring device and the printing device are held in a common housing, the computer being capable of recognizing the data acquiring device and the printing device as independent devices, a program stored in the recording medium comprising the steps acquiring, from the data acquiring device, data acquiring device identification information enabling distinction of the data acquiring device from other such data acquiring devices;

acquiring, from the printing device, printing device identification information enabling distinction of the printing device from other such printing devices; and comparing the data acquiring device identification information with the printing device identification information, and thereby judging whether both these devices are held in a common housing or not.

DETAILED DESCRIPTION OF THE PREFERRED EMBODIMENTS

Figure 1:
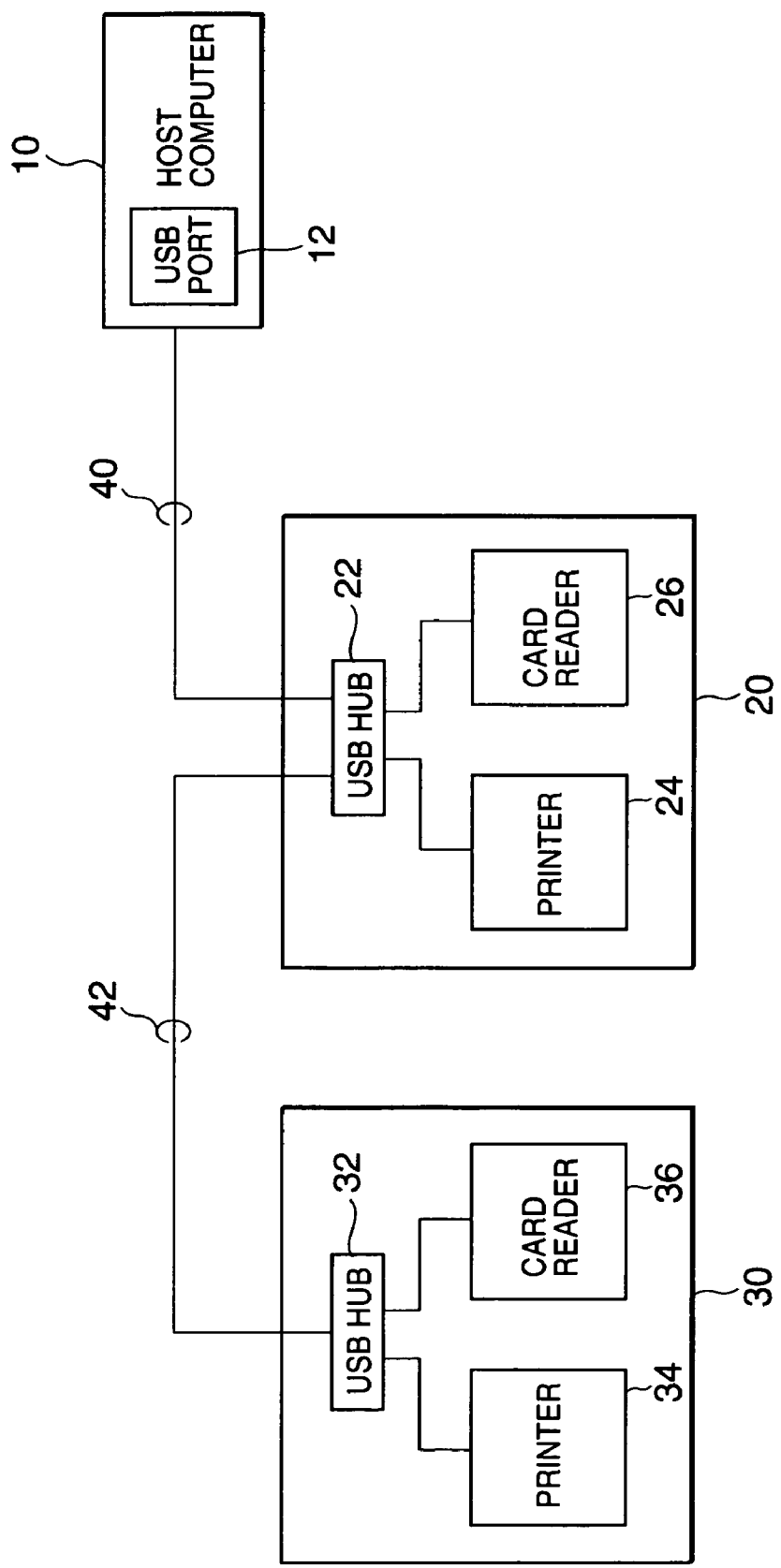
FIG. 1 is a diagram showing general hardware configuration of a printing system according to an embodiment of the invention.

FIG. 1 is a diagram that shows hardware configuration of a printing system according to an embodiment of the invention.

As shown in FIG. 1, the printing system shown here includes a host computer 10, and multifunction printers 20, 30 connected to the host computer 10.

In this embodiment, the host computer 10 is a notebook-sized or desktop personal computer. The host computer 10 has a USB (universal serial bus) port 12. Connected to the USB port 12 is a USB cable 40, and through this USB cable 40, the host computer 10 is connected to the multifunction printer 20.

The multifunction printer 20 includes a USB hub 22, printer 24 and card reader 26. These USB hub 22, printer 24 and card reader 26 are housed in a single housing.

Connected to the USB hub 22 of the multifunction printer 20 is the USB cable 40 mentioned above. Further connected to the USB hub 22 are the printer 24 and the card reader 26.

In the embodiment shown here, the printer 24 is a color-ink jet printer, and the card reader 26 is a PC card reader in accordance with PCMCIA (Personal Computer Memory Card International Association) standard. The card reader 26 is a drive for reading out information from a PC memory card inserted therein and writing information onto the PC memory card. In this embodiment, it is mainly assumed that the PC memory card stores image data taken by a so-called digital camera. Such data stored in the PC memory card, however, may be image data stored by any other method, and also, it is not limited to image data.

The USB hub of the multifunction printer 20 is connected to a USB hub 32 of the multifunction printer 30 through a USB cable 42. The multifunction printer 30 similarly includes the USB hub 32, printer 34 and card reader 36. These USB hub 32, printer 34 and card reader 36 are devices corresponding to the USB hub 22, printer 24 and carder reader 26 of the multifunction printer 20.

These printers 24 and 34 are printing devices in this embodiment. The card readers 26 and 36 are storage medium read-out devices which constitute data acquiring devices in this embodiment.

Figure 2:
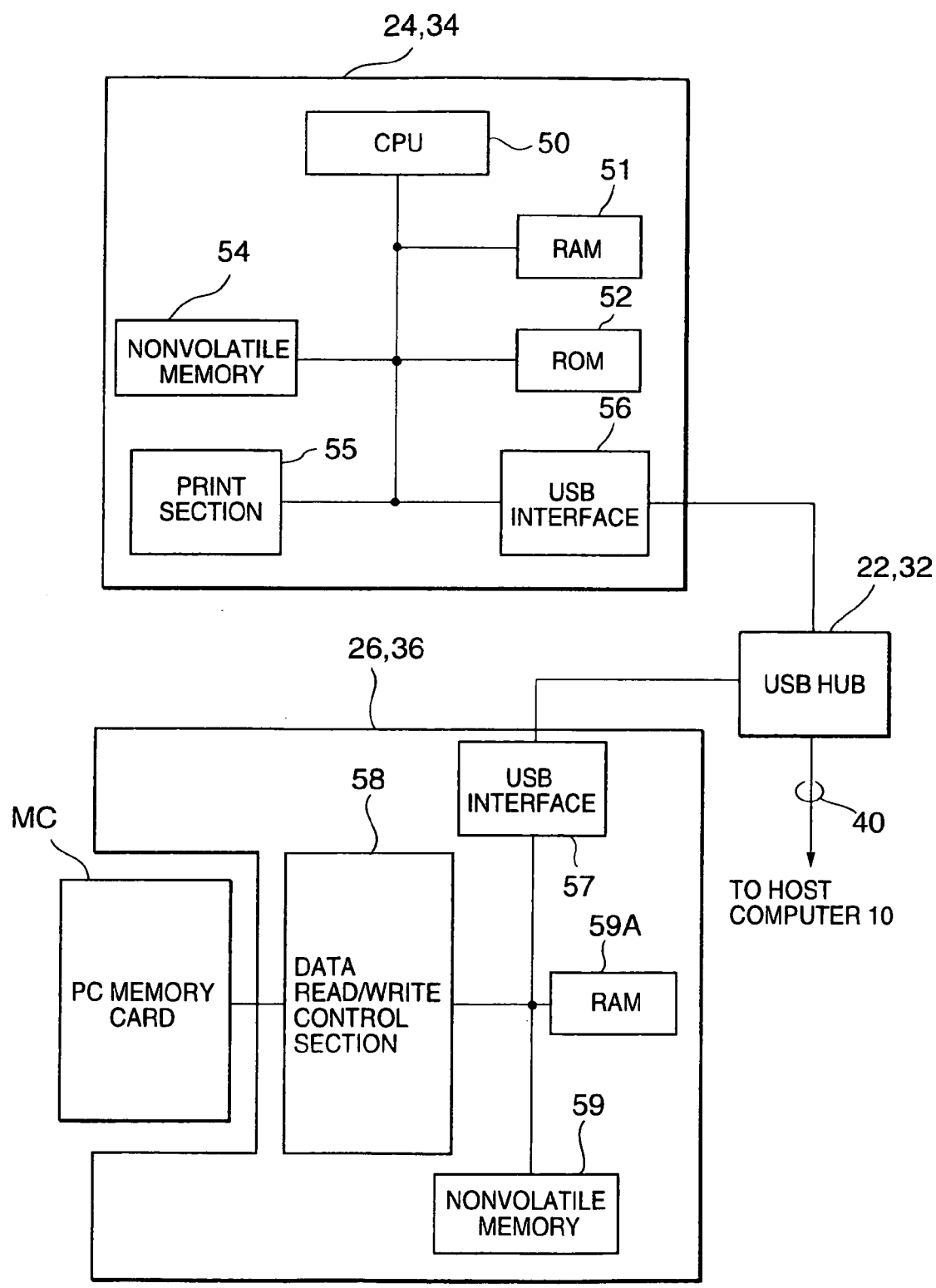
FIG. 2 is a block diagram of internal configuration of a printer and a card reader.

FIG. 2 is a block diagram for explaining internal configuration of a printer 24, 34 and a card reader 26, 36 in detail.

As shown in FIG. 2, the printer 24, 34 each includes, as its major components, CPU 50, RAM (random access memory) 51, ROM (read only memory) 52, nonvolatile memory (such as electrically erasable programmable ROM) 54, print section 55 and USB interface 56. These CPU 50, RAM 51, ROM 52, nonvolatile memory 54, print section 55 and USB interface 56 are connected together by internal bus.

Figure 3A:
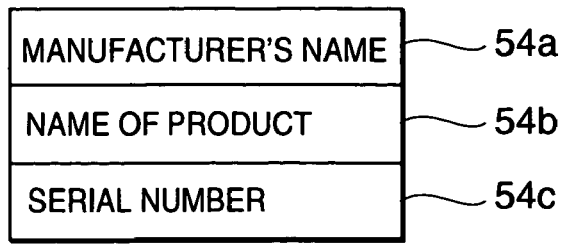
FIG. 3A is a diagram showing identification information stored in a nonvolatile memory of the printer.
Figure 3B:
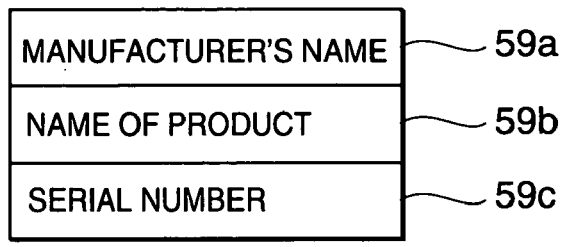
FIG. 3B is a diagram showing identification information stored in a nonvolatile memory of the card reader.

CPU 50 in the printer 24, 34 is a central arithmetic processing unit for controlling printing operation of the printer 24, 34. ROM 52 is a nonvolatile memory that stores programs to be executed by CPU 50, character fonts, and so on. CPU 50 reads a necessary program or data from ROM 52 and executes its operation at an arbitrary timing. The nonvolatile memory 54 is a memory that stores identification information regarding the printer 24, 34 as nonvolatile storage in an electrically erasable and rewritable state. As shown in FIG. 3A, in this embodiment, the nonvolatile memory 54 has a manufacturer's name storage region 54a, product's name storage region 54b, and serial number storage region 54c which store the manufacturer's name, product's name and serial number, respectively. The USB interface 56 shown in FIG. 2 is an interface for connecting a cable from the USB hub 22, 32, and through this USB interface 56, the printer 24, 34 exchange data with the host computer 10.

That is, the printer 24, 34 receives data from the host computer 10 via the USB interface 56, and its printing section 55 executes printing. Further, if the host computer 10 so requests, the printer 24, 34 transmits identification information stored in the nonvolatile memory 54 to the host computer 10 through the USB interface 56.

The card reader 26, 36 includes, as its major components, a USB interface 57, data read/write control section 58, nonvolatile memory (for example, electrically erasable programmable ROM) 59, and RAM 59A. These USB interface 57, data read/write control section 58, nonvolatile memory 59 and RAM 59A are connected together by internal bus.

A PC card MC is set in the card reader 26, 36. The inserted PC memory card can be removed. That is, the card readers 26 and 36 are configured to permit set and removal of the PC card MC.

The data read/write control section 58 of the card reader 26, 36 is a controller for reading data from an inserted PC card and writing data onto the PC memory card. Data read out by the data read/write control section 58 (image data in this embodiment) is transmitted to the host computer 10 through the USB interface 57. Data transmitted from the host computer 10 is received by the data read/write control section 58 via the USB interface 57, and written onto the PC memory card MC. The nonvolatile memory 59 is a memory identification information about the card reader 26, 36 as nonvolatile storage in an electrically erasable and rewritable state. As shown in FIG. 3A, in this embodiment, the nonvolatile memory 59 has a manufacturer's name storage region 59a, product's name storage region 59b, and serial number storage region 59c which store the manufacturer's name, product's name and serial number, respectively. Here again, these identification data are transmitted to the host computer 10 via the USB interface 57.

In the embodiment shown here, the same serial numbers are assigned to the printers 24, 34 and the card readers 26, 36 that are stored in common housings. That is, the serial number of the printer 24 and the serial number of the card reader 26 are the same, and the serial number of the printer 34 and the serial number of the card reader 36 are the same. Then, the host computer 10 can confirm from each serial number that the printer 24 and the card reader 26 belong to the common multifunction printer 20, and that the printer 34 and the card reader 36 belong to the common multifunction printer 30.

Figure 4:
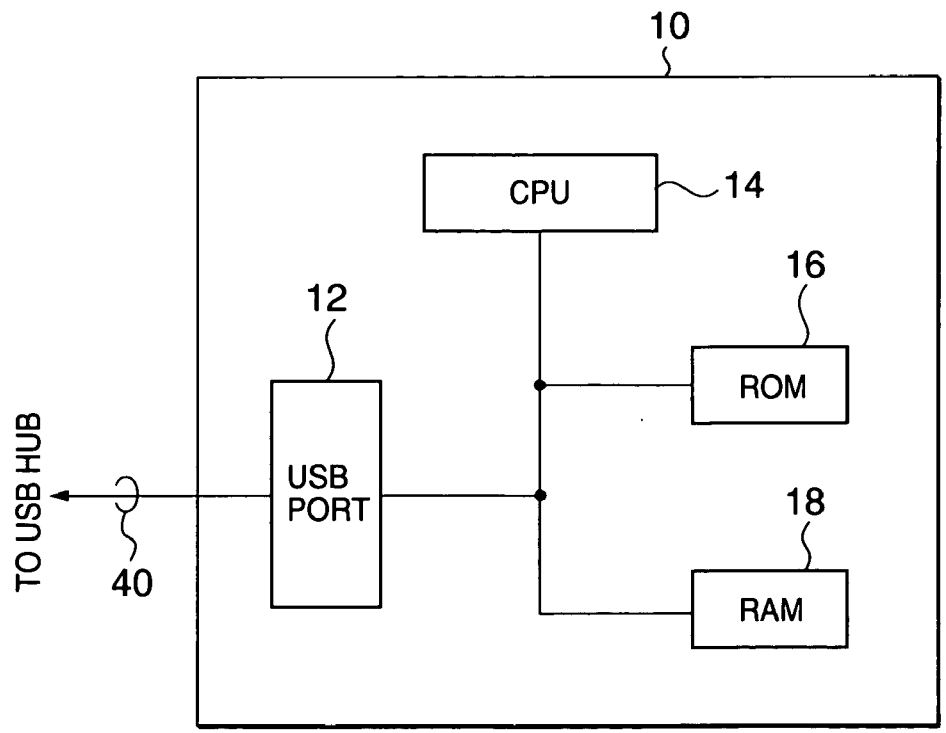
FIG. 4 is a block diagram showing an outline of internal configuration of a computer.

FIG. 4 is a block diagram for explaining internal configuration of the host computer 10 in detail.

As shown in FIG. 4, the host computer includes CPU 14, ROM 16, RAM 18 and above-mentioned USB port 12. These USB port 12, CPU 14, ROM 16 and RAM 18 are connected together by internal bus.

CPU 14 is a central arithmetic processing unit that executes various kinds of arithmetic processing of the host computer 10. ROM 16, which will be explained in detail with reference to FIG. 5, stores image processing application 60, programs of the USB printer driver 62, USB card reader diver 64, USB controller 66, mode switching application 67 and direct print application 68 and so on, as nonvolatile storage. CPU 14 reads out any of these programs from ROM 16 and executes them at arbitrary timing. RAM 18 is a volatile memory for storing data, etc. required for executing the above-mentioned various programs.

Figure 5:
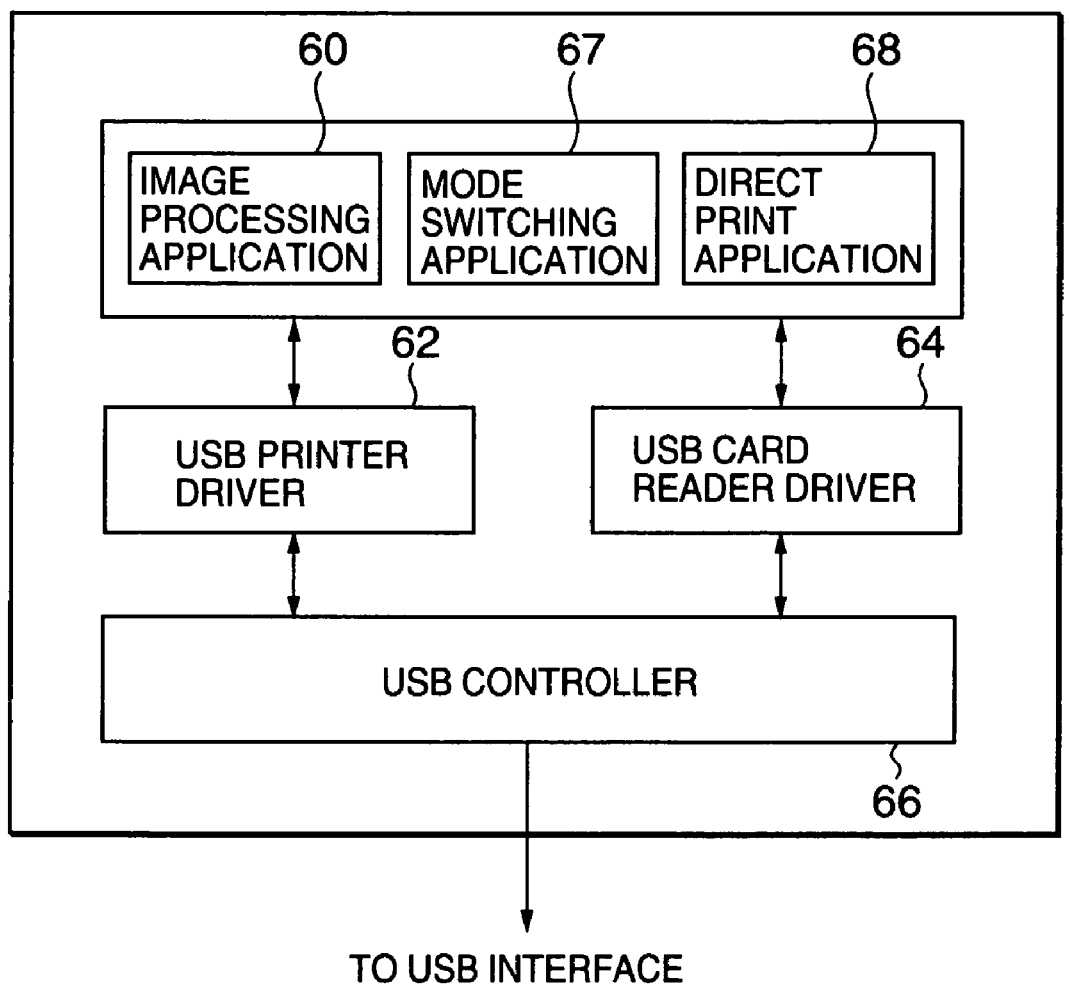
FIG. 5 is a diagram showing relations among image processing application, mode switching application, direct print application, USB printer driver, USB card reader driver and USB controller executed in the computer.

Next explained is entire processing of the printing system according to the embodiment with reference to FIG. 5 and FIG. 1 referred to before. FIG. 5 is a block diagram showing mutual relation of programs related to this embodiment, which are executed by CPU 14.

As shown in FIG. 5, programs of an image processing application 60, USB printer driver 62, USB card reader driver 64, USB controller 66, mode switching application 67 and direct print application 68 are executed in CPU 14.

The image processing application 60 is a program that reads image data from a PC memory card inserted in the card reader 26, 36 and conducts necessary image processing as shown in FIG. 1. That is, a memory card set in the card reader 26, 36 stores image data of multi-values of the RGB (red, green and blue)-based, for example. Red, green and blue are three primary colors of light in the additive color process. In this embodiment, for example, multi-value image data expressed by 256 tones from 0 to 255 for each of red, green and blue is stored for each pixel.

After reading out this image data, the image processing application 60 converts the RGB-based image data into the YMC (yellow, magenta and cyan)-based data, for example. Yellow, magenta and cyan are three primary colors of ink in the subtractive color process. The image processing application 60 converts multi-value data represented by a plurality of tones into multi-value data, which is represented by fewer tones, concerning each pixel of the image data read out thereby. That is, the image processing application 60 performs color conversion from the RGB system to the YMC system and reduction of multi-values. In this embodiment, the image processing application 60 converts multi-value image data into image data with two values for each of yellow, magenta and cyan per each pixel.

The host computer 10 outputs the image data after the image processing to the printer 24, 34. The printer 24, 34 in receipt of this image data prints out a color image based on the image data.

In such a series of printing proceedings, the image processing application 60 exchanges data with the multifunction printer 20 through the USB printer driver 62, USB card reader driver 64 and USB controller 66.

The USB printer driver 62 is a program for controlling the printers 24 and 34 of the multifunction printers 20 and 30. In this embodiment, the USB printer driver 62 has the function of acquiring identification information, such as serial number of the printer 24 or 34, etc., in accordance with a request from the image processing application 60 in addition to the function of transmitting image data to be printed. That is, the USB printer driver 62 functions to return identification information of the printer 24, for example, when the image processing application 60 requests it. Similarly, the USB printer driver 62 functions to return identification information of the printer 34, for example, to the image processing application 60 when the image processing application 60 requests so. That is, the image processing application 60 gets hold of the number of printers 24, 34 connected to the host computer 10, and when it needs identification information, it makes an inquiry to the USB printer driver 62, specifying which of the printer 24 and the printer 34 is the printer that it needs the identification information about. This inquiry is transmitted to the printer 24 or the printer 34 via the USB controller 66. The printer 24 or 34 in receipt of this inquiry replies to the USB printer driver 62 via the USB controller 66.

The USB card reader driver 64 is a program for controlling the card readers 26, 36 of the multifunction printers 20, 30. The USB card reader driver 64 has the function of giving identification information like serial numbers of the card readers 26, 36 and control information like presence or absence of a PC memory card in response to a request from the image processing application 60, in addition to exchange of data with the card readers 26, 36. That is, the USB card reader driver 64 functions to collectively return control information of the card readers 26, 36 to the image processing application 60 when the image processing application 60 requests control information about the card readers 26, 36. In other words, the image processing application 60 need not grasp the number of card readers 26, 36 controlled by the host computer 10, and when it needs control information, it makes an inquiry about such control information to the USB card reader driver 64 without specifying a particular card reader. This inquiry is transmitted to the card readers 26, 36 via the USB controller 66. The card readers 26, 36 in receipt of the inquiry return control information to the USB card reader driver 64 through the USB controller 66.

Figure 6:
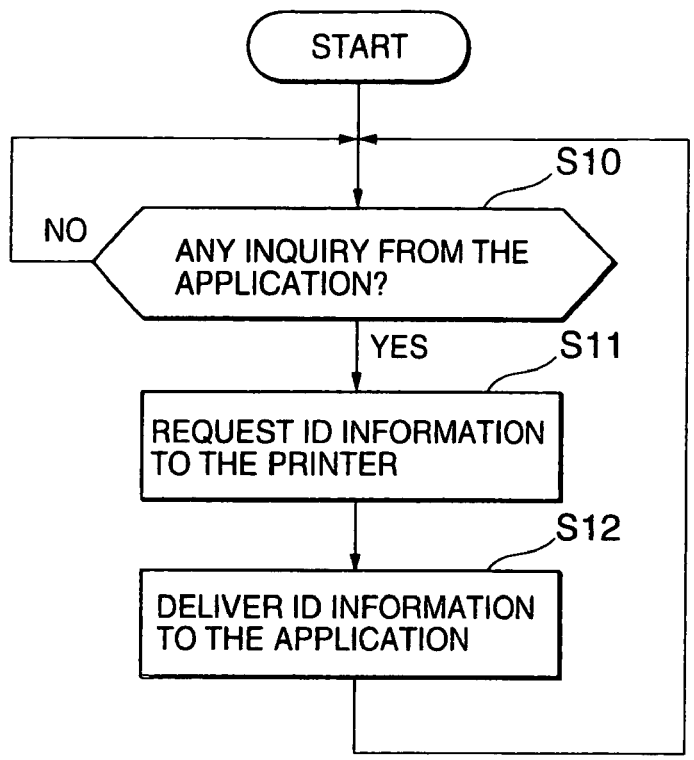
FIG. 6 is a flow chart that explains proceedings by the USB printer driver upon a request of identification information from the image processing application.
Figure 7:
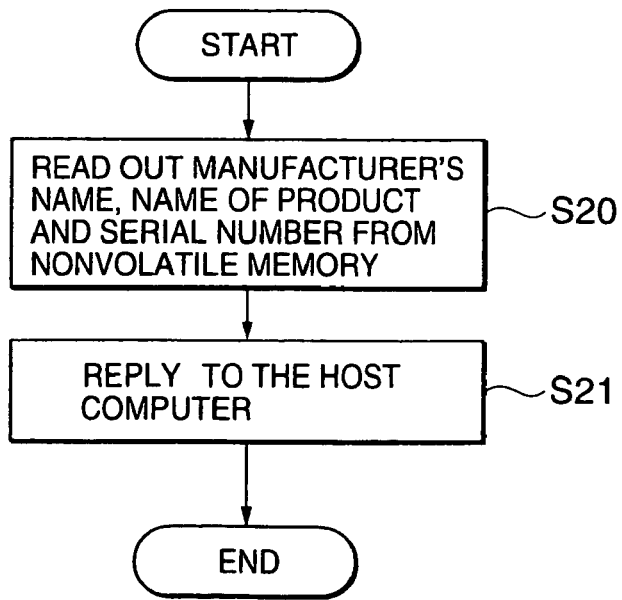
FIG. 7 is a flow chart that explains proceedings by the printer upon a request of identification information from the USB printer driver through the USB controller.

Next referring to FIGS. 6 and 7, detailed explanation is made about proceedings responsive to a request for identification information from the image processing application 60 to the USB printer driver 62. FIG. 6 is a flowchart of proceedings for inquiring identification information in the USB printer driver 62, and FIG. 7 is a flowchart of proceedings for inquiring identification information in the printers 24, 34.

First about the process in the USB printer driver 62, as shown in FIG. 6, the USB printer driver 62 judges whether there is an inquiry of identification information from the image processing application 60 (step S10). If there is not any inquiry for identification information (step S10: No), this step S10 is repeated.

When there is an inquiry from the image processing application 60, the USB printer driver 62 requests identification information to a printer (step S11). The printer whose identification information is requested is specified in the inquiry from the image processing application 60. Assume here that the inquiry is made to the printer 24.

As shown in FIG. 2, the printer 24 receives this request for identification information through the USB interface 56. In receipt of the request for identification information, the printer 24 replies identification information including the manufacturer's name, product's name and serial number to the host computer 10 via the USB interface 56. The USB printer driver 62 receives this identification information via the USB controller 66 shown in FIG. 5.

Next as shown in FIG. 6, the USB printer driver 62 delivers the identification information including the manufacturer's name, product's name and serial number to the image processing application 60 (step S12). Through these steps, proceedings of the USB printer driver 62 responsive to an inquiry of identification information about a printer are completed, and the proceedings from step S10 are repeated.

Next explained are proceedings in the printer 24. As shown in FIG. 7, in receipt of an inquiry about identification information, the printer 24 reads out identification information including the manufacturer's name, product's name and serial number from the nonvolatile memory 54 (step S20). Consecutively, the printer 24 replies this identification information to the host computer 10 via the USB interface 56. Through these steps, proceedings responsive to an inquiry to the printer 24 about identification information are completed.

Figure 8:
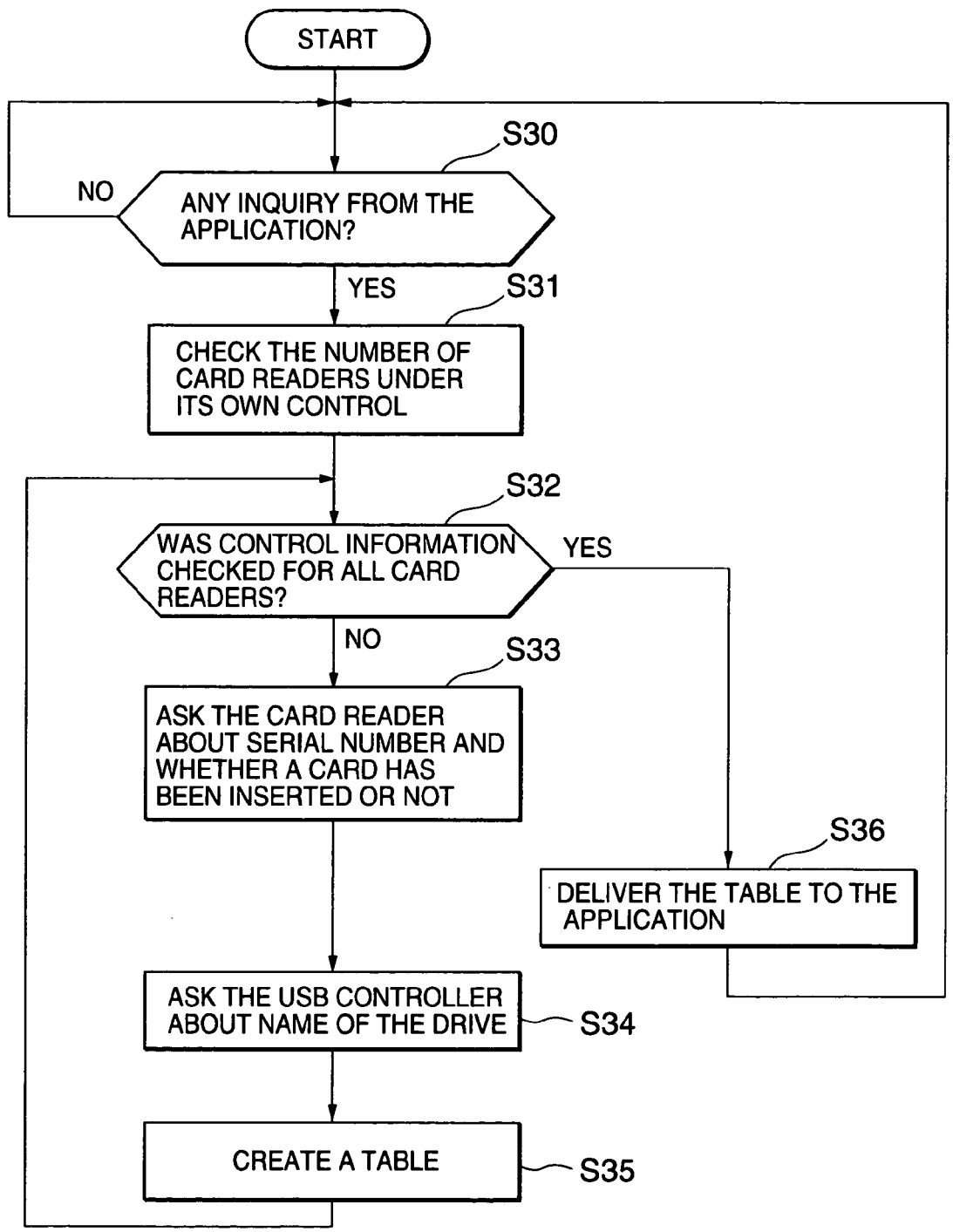
FIG. 8 is a flow chart that explains proceedings by the USB card reader driver upon a request of control information from the image processing application.
Figures 9, 10:
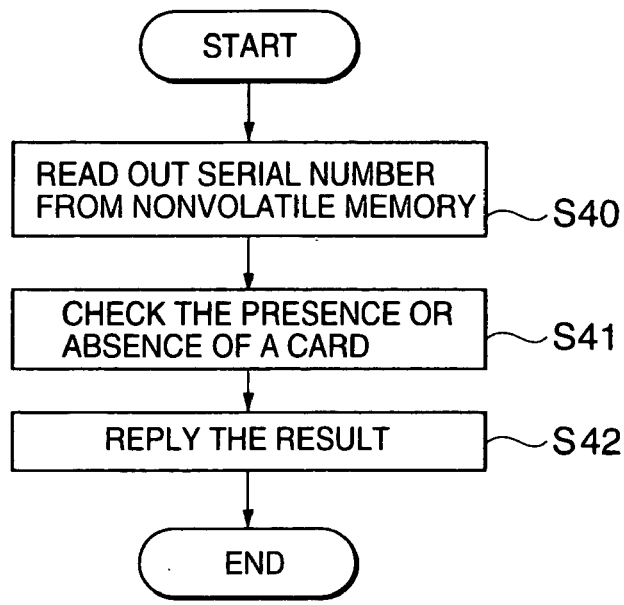
FIG. 9 is a flow chart that explains proceedings by the card reader upon a request of control information from the USB card reader driver via the USB controller.
FIG. 10 is a diagram that shows an exemplary table about control information created by the USB card reader driver.

Next referring to FIGS. 8 and 9, detailed explanation is made about proceedings upon a request for control information from the image processing application 60 to the USB card reader driver 64. As already explained above, this control information includes information about whether a card has been set or not, in addition to identification information about the serial number and others.

FIG. 8 is a flowchart of proceedings of an inquiry for control information in the USB card reader driver 64, and FIG. 9 is a flowchart of proceedings of an inquiry for control information in the card readers 26, 36.

First with regard to proceedings in the USB card reader driver 64, as shown in FIG. 8, the USB card reader driver 64 judges whether there is an inquiry about control information from the image processing application 60 (step S30). If there is no inquiry about control information from the image processing application 60 (step S30: No), this step S30 is repeated.

When there is an inquiry about control information from the image processing application 60 (step S30: Yes), the number of card readers controlled by the USB card reader driver 64 is checked (step S31). Assume here that the USB card reader driver 64 controls two card readers 26, 36 as shown in FIG. 1.

The USB card reader driver 64 next judges whether control information has been reviewed or not for all card readers (step S32). If control information has not been reviewed yet for all card readers (step S32: No), the USB card reader driver 64 inquires the serial number and presence of any card inserted to one card reader (step S33). For example, as shown in FIG. 1, in the case where it inquires the serial number and presence or absence of a card introduced into the card reader 26, this inquiry is transmitted to the card reader 26 via the USB controller 66. In receipt of this inquiry, the card reader 26 reads out the serial number from the nonvolatile memory 59, and at the same time, it detects whether a PC memory card MC has been put or not, by reviewing an electric signal. Then, it replies the serial number and whether a PC memory card MC has been inserted or not to the host computer 10.

Next as shown in FIG. 8, the USB card reader driver 64 makes an inquiry about the drive name of the card reader to the USB controller 66 (step S34). In receipt of this inquiry, the USB controller 66 investigates the drive name of the card reader and replies it to the USB card reader driver 64.

After that, the USB card reader driver creates a table about the serial number, presence or absence of any card inserted and drive name (step S35). An example of this table is shown in FIG. 10. The table shown in FIG. 10 is created for each card reader. Then, the flow returns to judgment of the step S32 to confirm whether control information has been reviewed for all card readers. By repeating these steps S32 through S35 for all card readers, tables are created individually for all card readers. That is, in the embodiment shown here, two tables, namely, table TB1 for the card reader 26 and table TB2 for the card reader 36, are created.

As shown in FIG. 8, in step S32 already explained, when it is judged that control information has been reviewed for all card readers (step S32: Yes), the tables thus created are delivered to the image processing application 60 (step S36), and proceedings are repeated from step S30. Thus, proceedings of the USB card reader driver 64 responsive to an inquiry of control information about card readers from the image processing application 60 are completed.

Next explained are proceedings of inquiring control information in a card reader, taking the card reader 26 as an example. As shown in FIG. 9, in receipt of an inquiry about the serial number and whether any memory card has been inserted or not, the card reader 26 reads out the serial number from the nonvolatile memory 59 (see FIG. 2) inside the card reader 26 (step S40). Consequently, the card reader 26 detects an electric signal of a PCMCIA port to confirm whether a PC memory card MC has been inserted or not (step S41). Then, the card reader 26 replies the serial number and presence or absence of a memory card inserted to the host computer 10 (step S42). Thus, proceedings of the card reader 26 in response to an inquiry on control information about the serial number and presence or absence of a memory card inserted are completed.

Figure 11:
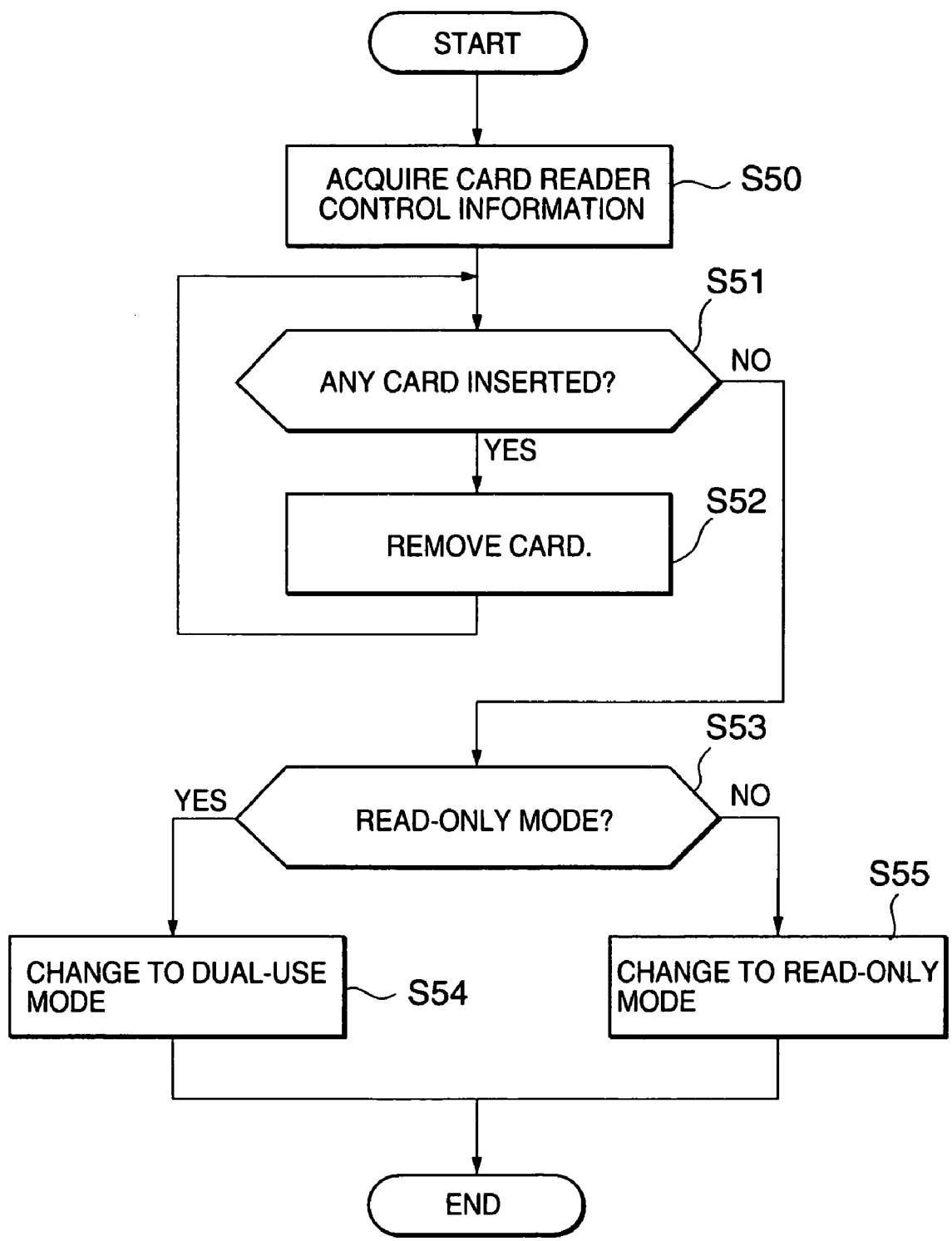
FIG. 11 is a flow chart that explains proceedings by the mode switching application.

Next referring to FIG. 11, explanation is made about a mode switching application 67 for the card readers 26, 36. FIG. 11 is a flowchart for explaining proceedings of a mode switching application 67 for switching modes of the card readers 26, 36. That is, the card readers 26, 36 can be switched for a read-only mode or a dual-use mode capable of both reading and writing by the mode switching application 67 on the part of the host computer 10. In other words, setting of modes of these card readers 26, 36 is under a software control by the host computer 10. In the explanation made below, let the card reader 26 be the subject of mode switching.

As shown in FIG. 11, the mode switching application 67 requests control information of the card readers 26, 36 to the USB card reader driver 64 as explained above, and acquires control information of the card readers 26, 36 (step S50). That is, when the mode switching application 67 requests control information of card readers to the USB card reader driver 64, control information of all card readers 26, 36 connected to the host computer 10 is replied.

Consecutively, the mode switching application 67 judges whether any PC memory card has been inserted or not in the card reader 26 to be switched in mode (step S51). In this case, the mode switching application 67 refers to the control information acquired to review information concerning whether a PC memory card has been inserted in the card reader 26 to be switched in mode, thereby judges whether a PC memory card has been inserted or not.

When the mode switching application 67 judges that a PC memory card is set in the card reader 26 (step S51: Yes), it displays the message "remove the PC memory card" (step S52) to have the user remove the PC memory card from the card reader 26. The purpose of confirmation that no PC memory card is inserted prior to switching modes lies in preventing that erroneous operation is done onto the PC memory card by mode switching. For example, it is prevented that the card reader 26 is changed from the read-only mode to the dual-use mode for reading and writing while a PC memory card is held in the card reader 26 and that erroneous writing on the PC memory card occurs.

When the mode switching application 67 judges that the card reader 26 has no PC card inserted in step S51 (step S51: No), it judges whether the card reader 26 is in the read-only mode or not at that time (step S53). If it judges that the current mode is the read-only mode (step S53: Yes), it changes the mode of the card reader 26 to the read and write dual-use mode (step S54). On the other hand, if it judges that the mode is not the read-only mode (step S53: No), the mode of the card reader 26 is changed to the read-only mode (step S55). Setting of the read-only mode and the dual-use mode is stored in the USB card reader driver 64. If, for example, the card reader 26 is set in the read-only mode, data writing of the card reader 26 is prohibited by the USB card reader driver 64. By completion of these steps S54 and S55, proceedings of this mode switching application 67 are completed.

The reason why the read-only mode and the read/write dual-use mode under a software control are prepared for the card readers 26, 36 lies in the fact that certain kinds of PC memory cards used with digital cameras and like apparatuses do not operate normally even if a part of image data is deleted. In the case where such a PC memory card is inserted in the card reader 26 or 36, contents of the PC memory card can be protected by setting or holding the card reader 26 or 36 in the read-only mode under the control of the host computer 10.

In the other cases, the card readers 26, 36 may be set in the read/write dual-use mode to enable both data writing and data reading similarly to ordinary card readers. Since the mode switching is under a software control, convenience for users is improved.

It will be apparent also from the explanation made above that, in the embodiment shown here, data writing should be construed to involve erasure of data as well. That is, erasure of data is one aspect of data writing.

Figure 12:
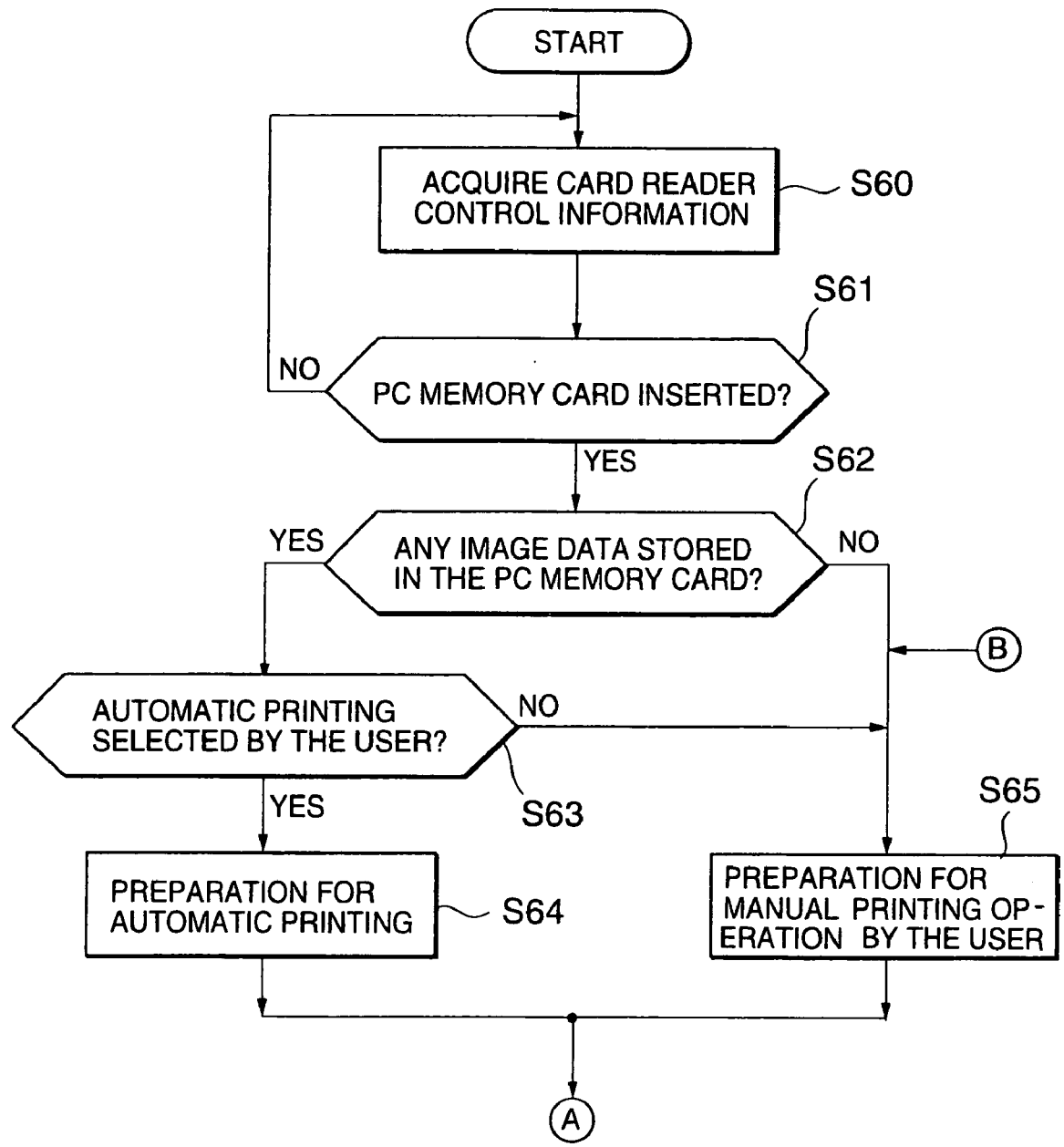
FIG. 12 is a first part of a flow chart that explains proceedings by the direct print application.
Figure 13:
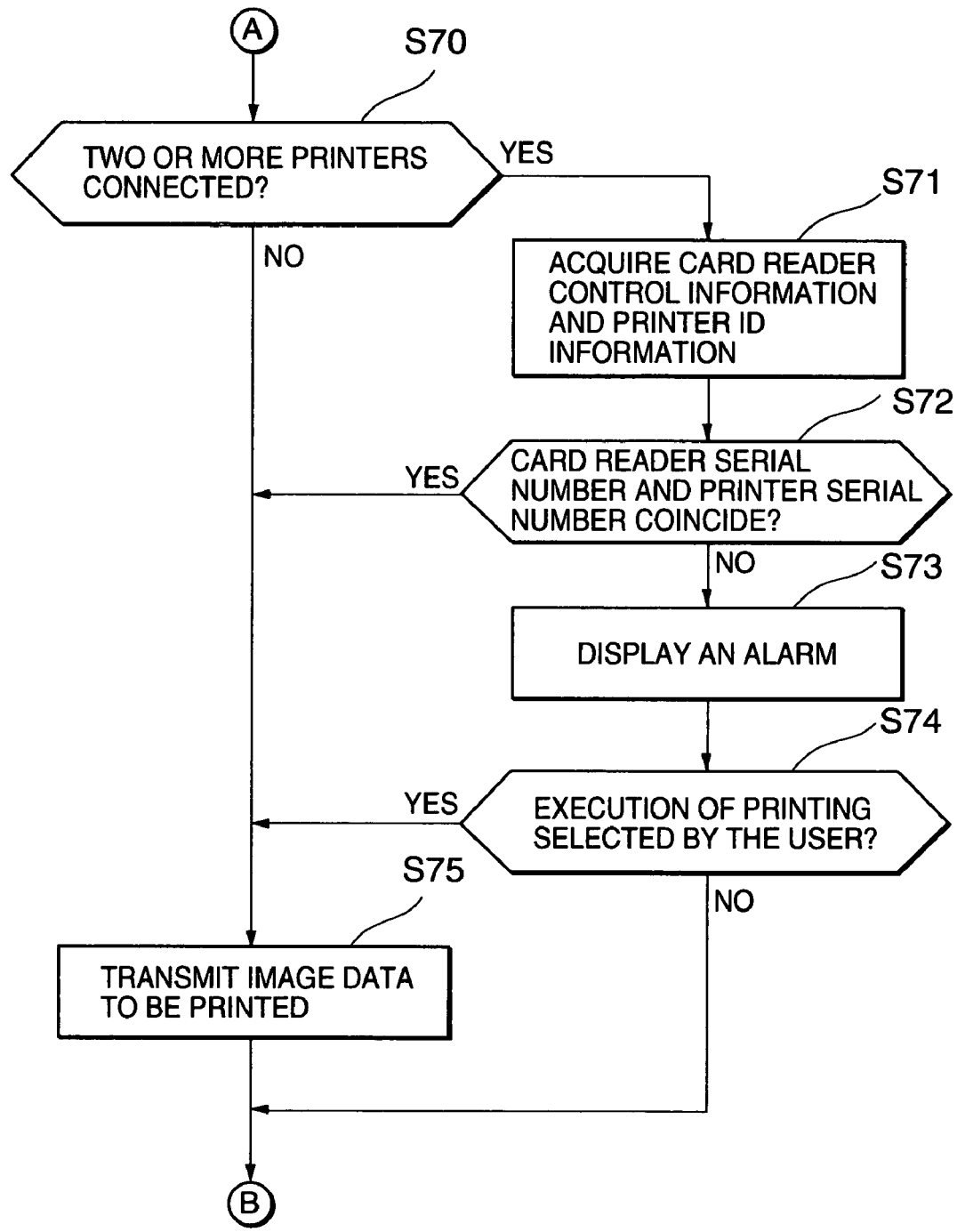
FIG. 13 is a second part of the flow chart that explains proceedings by the direct print application.

Next referring to FIGS. 12 and 13, proceedings of the direct print application 68 are explained. FIGS. 12 and 13 are a flow chart that explains proceedings of the direct print application 68. This direct print application 68 is started by pressing one of buttons particularly provided for it on main bodies of the multifunction printers 20, 30, for example. By preparing such exclusive buttons, a user can start the direct print application 68 by merely pressing one of such buttons, and easy printing operation similar to so-called direct printing is possible.

As shown in FIG. 12, the direct print application 68 started by such an exclusive button first requests control information of card readers 26, 36 to the USB card reader driver 64, and acquires it (step S60). Consecutively, the direct print application 68 extracts information regarding whether any PC memory card is in the card reader or not from the control information (step S61). Assume here that the card reader 26 (multifunction printer 20) is the target of operation.

When the direct print application 68 judges that any PC memory card has not been inserted in the card reader 26, it gives a caution that no PC memory card is in the card reader 26, and repeats the proceedings from step S60 already explained. On the other hand, when it judges that a PC memory card has been inserted (step S61: Yes), it subsequently judges whether any image data is stored or not in the PC memory card set in the card reader 26 (step S62).

If any image data is stored in the PC memory card (step S62: Yes), the direct print application 68 then reviews whether automatic printing has been selected by a user (step S63). If automatic printing has been selected (step S63: Yes), the application 68 executes preparation proceedings necessary for the automatic printing (step S64). For example, if the user has selected automatic printing of index printing, which prints all image data stored in the PC memory card with zooming out, then the application 68 reads all image data from the PC memory card, then performs color conversion, reduction of multi-values, zooming out of the size, and so on, and generates image data required for the index printing. If the user has selected automatic printing for sequentially printing all image data stored in the PC memory card in their original size, the application 68 reads the image data from the PC memory card, then performs color conversion, reduction of multi-values, and so on, and generates image data required for the printing.

On the other hand, if the application 68 judges that no image data is stored in the PC memory card (step S62: No) in step S62 explained above, or it judges in step S63 that the user has not selected automatic printing (step S63: No), the application 68 executes preparation for manual printing by the user (step S65). For example, when the user performed manipulation for printing a specific image data alone in the manual printing, the application 68 reads only that image data from the PC memory card, and executes its color conversion, reduction of multi-values, and so on.

Subsequently to the step S64 and step S65, as shown in FIG. 13, the direct print application 68 judges whether a plurality of printers are connected or not (step S70). Since the image processing application 60 grasps how many printers are connected to the host computer 10, the direct print application 68 can know it by making an inquiry to the image processing application 60.

In the case where a plurality of printers are connected (step S70: Yes), the direct print application 68 requests control information of the card readers 26, 36 to the USB card reader driver 64, and acquires it. At the same time, it requests identification information of the printer 24 to the USB printer driver 62, and acquires it (step S71). The proceedings for acquiring control information of the card readers 26, 36 can be omitted if the control information obtained in step S60 is used directly.

In the next step, the direct print application 68 extracts the serial number of the card reader 26 from the obtained control information of the card readers 26, 36, simultaneously extracts the serial number of the printer 24 from the obtained identification information of the printer 24, and judges whether these serial numbers coincide or not (step S72). When these two serial numbers do not coincide (step S72: No), the application 68 displays a warning (step S73). This warning is given by displaying on the display of the host computer 10 that the card reader having acquired the image data and the printer which is going to print are not those of a common multifunction printer in a common housing. Noticing this display, the user selects whether the printing should nevertheless be executed or should be stopped.

The direct print application 68 next judges whether the user has directly selected printing (step S74). When the user has not selected execution of printing (step S74: No), the flow returns to step S65.

On the other hand, if the user has selected execution of printing (step S74: Yes) or the application 68 does not judge in step S70 that a plurality of printers are connected (step S70: No) or it judges in step S72 that two serial numbers coincide (step S72: Yes), the direct print application 68 transmits the print image data to the printer. That is, it sends the print image data prepared in step S64 or step S65 to the printer 24. Then, the flow returns to the proceeding of step S65. The reason why the flow returns to step S65, i.e. the proceeding of preparation for printing by the user's manipulation lies in that the user often prints only his or her favorite images in a normal size after index printing by automatic printing, for example.

As explained above, according to the printing system of this embodiment, since the host computer 10 can recognize printers 24, 34 and card readers 26, 36 as independent devices as shown in FIG. 1, the printers 24, 34 and the card readers 26, 36 can be utilized effectively. That is, also in multifunction printers 20, 30 having printers 24, 34 and card readers 26, 36 contained in common housings, these printers 24, 34 and card readers 26, 36 can be accessed to as independent devices. Therefore, for example, the host computer 10 can read out data stored in a PC memory card from the card reader 26 or 36.

Furthermore, since the host computer 10 can read out data stored in the PC memory card from the card readers 26, 36, the host computer 10 can be configured to engage in image processing necessary for print image data stored in a PC memory card with the printer 24 or 34. That is, color conversion and reduction of multi-values can be done by the image processing application 60 of the host computer 10. Therefore, the multifunction printer need not have an image processing section, and its cost can be reduced.

Further, as shown in FIG. 5, since the USB card reader driver 64 is configured to grasp the number of card readers 26, 36 connected to the host computer 10, load to the image processing application 60 can be reduced. That is, the image processing application 60 need not grasp how many card readers 26, 36 are connected to the host computer 10. Therefore, what the image processing application 60 has to do is to request control information to the USB card reader driver 64 without specifying a particular card reader when it needs control information about the card readers 26, 36.

Additionally, as shown in FIG. 12, when no PC memory card is inserted in the card reader 26, the direct print application 68 gives a notice to the user before proceedings for printing is started. Therefore, the user is informed that no PC memory card has been set before a PC memory card is actually accessed by proceedings for printing. As a result, subsequent printing proceedings can be automated.

Moreover, as shown in FIG. 13, since it is reviewed whether the serial number of the card reader that has read out image data coincides with the serial number of the printer that is going to print, it is prevented that image data is printed by a different multifunction printer not intended by the user. For example, as shown in FIG. 1, in the case where a plurality of multifunction printers 20, 30 are connected to the host computer 10, if image data read out from the card reader 26 of the multifunction printer 20 is going to be printed by the printer 34 of the multifunction printer 30, a notice indicating that a different multifunction printer is going to be used for printing can be given to the user. As a result, the system can prevent that data is unintentionally output to a multifunction printer distant from the user and that data is erroneously output to a multifunction printer in a location absolutely outside his or her territory. However, it is possible that the user desires to print the data with the printer 34 of the different multifunction printer 30. Therefore, the system enables the use of the different printer 34 if so desired.

Figure 14:
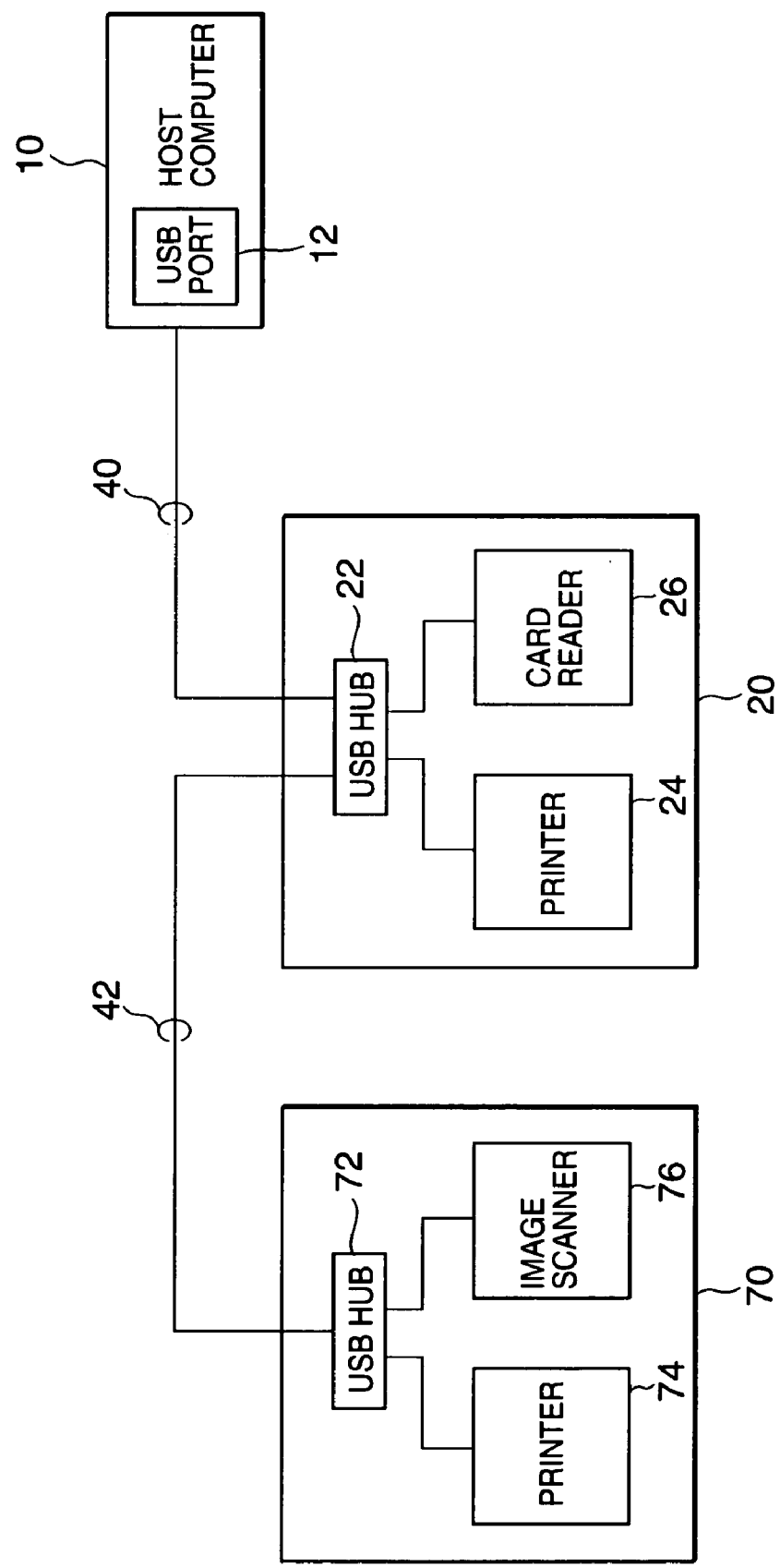
FIG. 14 is a diagram that illustrates a printing system including a multifunction printer with an image scanner as a data-acquiring device.

The invention is not limited to the embodiment described above but involves various changes and modifications. For example, as shown in FIG. 14, a multifunction printer 70 having an image scanner 76 as a data-acquiring device may be connected to the multifunction printer 20 having the card reader 26 as a data-acquiring device. This multifunction printer 70 also includes a USB hub 72 and a printer 74 in addition to the image scanner 76, and it is connected to the multifunction printer 20 by the USB cable 42 via the USB hub 72. The invention is also applicable to this multifunction printer 70.

Figure 15:
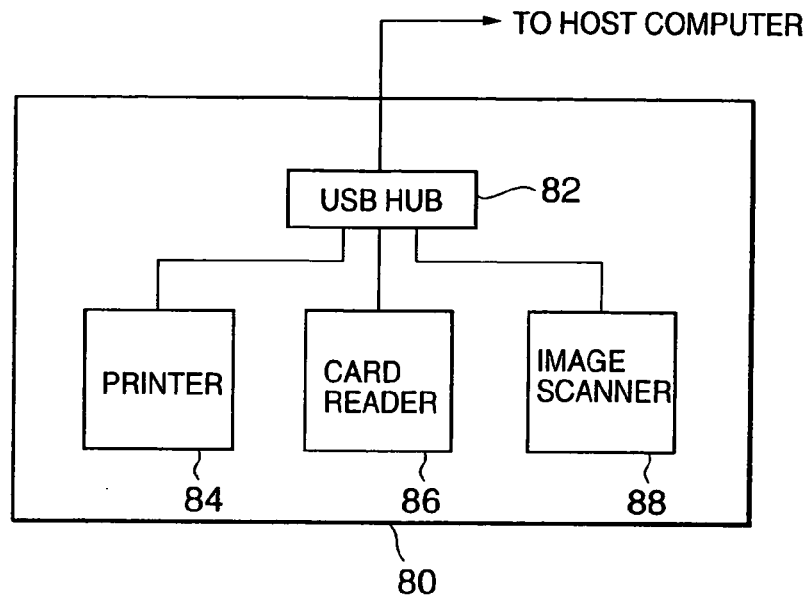
FIG. 15 is a block diagram that illustrates hard wafer configuration of a multifunction printer having a printer, card reader and image scanner.
Figure 16:
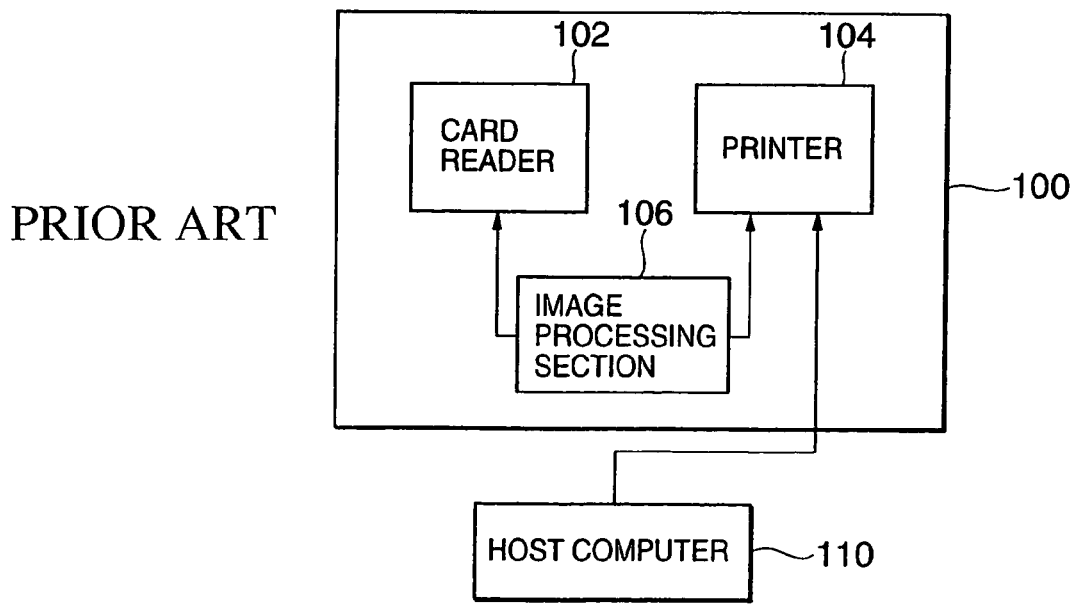
FIG. 16 is a diagram that shows internal configuration of a conventional multifunction printer.
Figure 17:
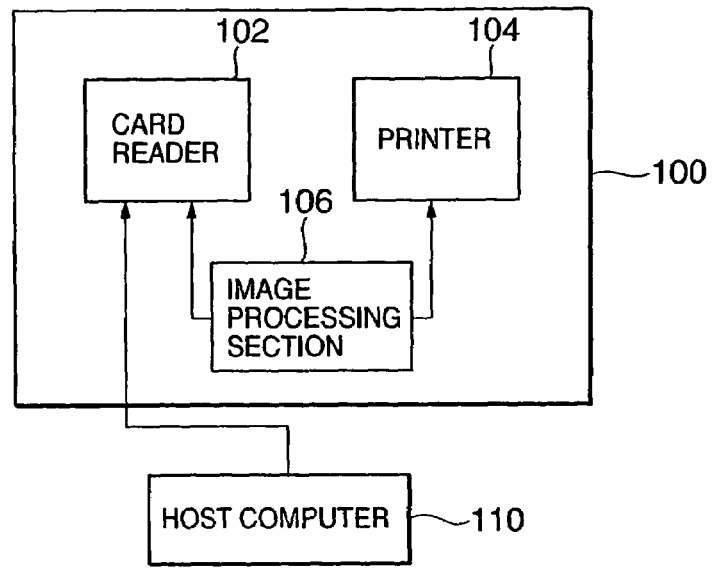
FIG. 17 is a diagram that shows internal configuration of another conventional multifunction printer.
Figure 18:
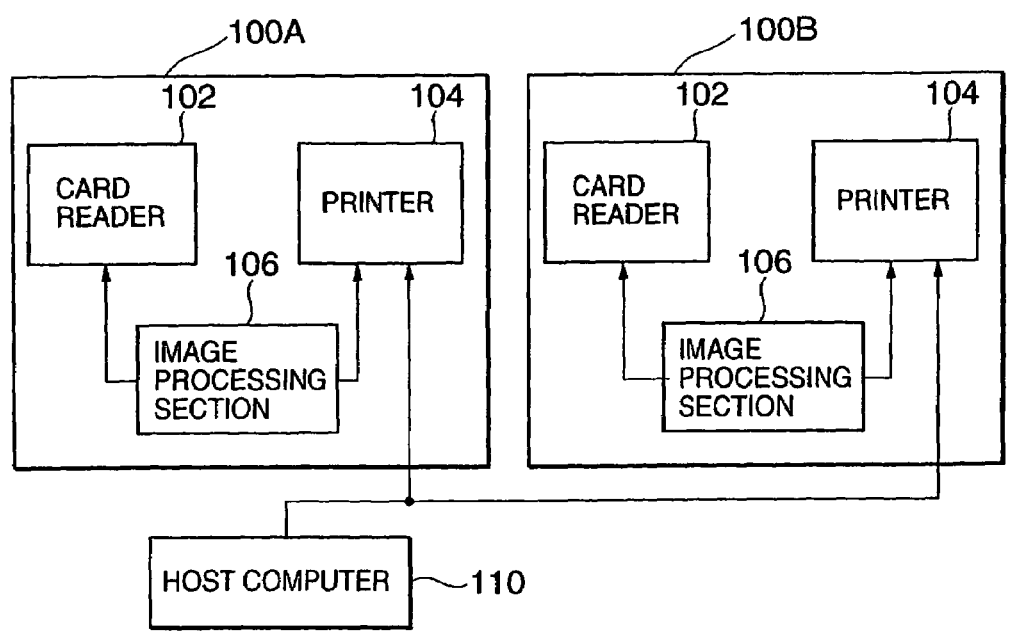
FIG. 18 is a diagram that shows a plurality of multifunction printers are connected to a single host computer.

Further, as shown in FIG. 15, the invention may be used to a multifunction printer 80 containing a USB hub 82, printer 84, card reader 86 and image scanner 88. In this case, the printer 84, card reader 86 and image scanner 88 has the same serial number.

In the embodiment described above, the printers 24, 34 have been explained as being ink jet printers of the YMC (yellow, magenta and cyan) system. However, they are not limited to this kind of printers, but they may be ink jet printers using yellow, magenta, cyan and black inks (YMCK). Those using black in addition to three primary colors (YMC) of ink in the subtractive color process are one type of YMC-system ink jet printers. Further, image data stored in PC memory cards need not be of the RGB system but may be of the YUV system, for example.

The direct print application 68 shown in FIGS. 12 and 13 is configured to give a notice when the card reader having read out image data belongs to a multifunction printer different from a multifunction printer to which the printer going to be used for printing belongs. However, the application 68 may be configured in the contrary so as to give a notice when both belong to a common multifunction printer.

Further, in respective proceedings explained with the foregoing embodiment, the programs for executing these proceedings can be distributed in form of a recording medium such as CD-ROM (compact disc read only memory), ROM, memory card, for example, which stores them. In this case, once the host computer 10 reads the programs from such a recording medium and executes the programs, the embodiment explained above can be realized.

In many cases, the host computer 10 has other programs such as operating system, other application programs, and so on. In these cases, efficiently using the own programs of the host computer 10, instructions for calling programs from the own programs of the host computer 10, which realize processing equivalent to the processing of the foregoing embodiment, may be recorded on the recording medium.

These programs may also be distributed as carrier waves through a network, instead of the form of a recording medium. The programs, transmitted as carrier waves through a network, are stored in the host computer 10 and can be executed to realize the foregoing embodiment.

In some cases, the program is encrypted and/or compressed when it is recorded on a recording medium or transmitted as carrier waves through a network. In these cases, the host computer 10, having read the programs from the recording medium or carrier waves, has to decode and/or expand the programs before executing it.

As described above, according to the invention, since the computer can recognize a data acquiring device and a printing device as independent devices even when they are held in a single housing of a multifunction printer, the data acquiring device and the printing device can be utilized effectively.

Furthermore, regarding a multifunction printer holding a data acquiring device and a printing device in a single housing, by holding identification information indicating that such data acquiring device and printing device held in a common housing belong to a common printing machine, a computer to which the multifunction printer is connected can identify the data acquiring device and the printing machine as being held in a common housing.

What is claimed is:

1. A multifunction printer comprising:
   a data acquiring device for acquiring original image data and being recognizable as an independent device by a computer to which said data acquiring device is connected; and
   a printing device for printing print image data generated by image processing of said original image data and being recognizable as an independent device by the computer to which said printing device is connected,
   wherein said data acquiring device and said printing device are held in a common housing case, and said data acquiring device and said printing device hold identification information indicating that said data acquiring device and said printing device are held in said common housing case.

2. The multifunction printer according to claim 1, wherein said data acquiring device and said printing device held in the common housing, hold a common serial number used as said identification information.

3. The multifunction printer according to claim 1 wherein said data acquiring device and said printing device transmit said identification information to the computer in response to a request therefrom.

4. The multifunction printer according to claim 1 wherein said data acquiring device is a storage medium read-out device capable of removably setting a storage medium storing said original image data, and said original image data is acquired by reading said storage medium.

5. The multifunction printer according to claim 1 wherein said data acquiring device is an optical image read-out device that optically reads paper representing an original image, and said original image data is acquiring by optically reading paper representing said original image.

6. A computer, to which multifunction printers are connected, each of the multifunction printers holding in a common housing case, a data acquiring device for acquiring image data and a printing device for printing the image data, the computer being capable of recognizing said data acquiring devices and said printing devices of the multifunction printers independently, the computer comprising:
 a data acquiring device control section for controlling said data acquiring devices and for acquiring original image data from one of said data acquiring devices;
 a print image data generating section for acquiring said original image data from said data acquiring device control section and for generating print image data which one of said printing devices can print; and
 a printing device control section for controlling said printing devices, acquiring said print image data from said print image data generating section and transmitting said print image data to said one of said printing devices,
 wherein said print image data generating section does not realize a number of said data acquiring devices connected to the computer, but said data acquiring device control section realizes the number of said data acquiring devices connected to the computer, and
 wherein said printing device control section does not realize a number of said printing devices connected to the computer, but said print image data generating section realizes the number of said printing devices connected to the computer.

7. The computer according to claim 6 wherein said data acquiring device holds data acquiring device identification information enabling distinction of said data acquiring device from other such data acquiring devices, and when said print image data generating section needs said data acquiring device identification information, said print image data generating section requests said data acquiring identification information to said data acquiring device control section without specifying said data acquiring device, and
 wherein said printing device holds printing device identification information enabling distinction of said printing device from other such printing devices, and when said print image data generating section needs said printing device identification information, said print image data generating section requests said printing device identification information to said printing machine control section while specifying said printing device.

8. The computer according to claim 6, wherein said print image data generating section converts said original image data made up of RGB-based data into said print image data made up of YMC-based data.

9. The computer according to claim 6, wherein said print image data generating section converts said original image data expressed by multi-value data indicating a plurality of tones for each pixel into said print image data expressed by multi-value data for each pixel, the number of values of said print image data is less than that of said original image data.

10. The computer according to claim 6, wherein said data acquiring device is a storage medium read-out device capable of removably setting a storage medium storing said original image data, and said original image data is acquired by reading said storage medium.

11. The computer according to claim 6, wherein said data acquiring device is an optical image read-out device that optically reads paper representing an original image, and said original image data is acquired by optically reading paper representing said original image.

12. A computer to which a multifunction printer is connected, said multifunction printer holding a data acquiring device for acquiring image data and a printing device for printing the image data, in a common housing case, said multifunction printer holding identification information indicating that said data acquiring device and said printing device are held in the common housing case, said computer being capable of recognizing said data acquiring device and said printing device independently, comprising:
 a data acquiring device identification information acquiring section that acquires, from said data acquiring device, data acquiring identification information enabling distinction of said data acquiring device from other such data acquiring devices;
 a printing machine identification information acquiring section that acquires, from said printing machine, printing device identification information enabling distinction of said printing device from other such printing device; and
 a comparing section that compares said data acquiring device identification information with said printing device identification information to judge whether said both devices are held in the common housing case or not.

13. The computer according to claim 12 further comprising:
 a first notifying section that gives a notice to a user when said data acquiring device and said printing device are not held in the common housing.

14. The computer according to claim 12 further comprising:
 a second notifying section that gives a notice to a user when said data acquiring device and said printing device are held in the common housing.

15. The computer according to claim 12 further comprising:
 a selecting that enables a user to select said printing device for printing said image data even when said data acquiring device and said printing device are not held in the common housing.

16. The computer according to claim 12 wherein said data acquiring device is a storage medium read-out device capable of removably setting a storage medium storing said original image data, and said original image data is acquiring by reading said storage medium.

17. The computer according to claim 16 further comprising:
 a storage medium loading information acquiring section that acquires, from said storage medium read-out device, storage medium loading information about whether said storage medium has been set or not; and
 a third notifying section that judges from said storage medium loading information whether said storage medium has been set or not, and gives a notice to a user when said storage medium has not been set.

18. The computer according to claim 12 wherein said data acquiring device is an optical image read-out device that optically reads paper representing an original image, and said original image data is acquired by optically reading paper representing said original image.

19. A computer to which a multifunction printer is connected, said multifunction printer holding a storage medium read/write device for reading image data from a storage medium and writing image data on said storage medium and a printing device for printing the image data in a common housing, said computer being capable of recognizing said data acquiring device and said printing device independently, comprising:
a storage medium read/write device control section that controls said storage medium read/write device and acquires original image data from said storage medium read/write device, said storage medium read/write device control section having a dual-use mode permitting reading of image data from said storage medium and writing of image data onto said storage medium and a read-only mode prohibiting writing of image data onto the storage medium but permitting only reading of image data from said storage medium;
a print image data generating section that acquires said original image data from said storage medium read/write device control section, and generates print image data that can be printed by said printing device by executing image processing of said image data; and
a printing device control section that controls said printing device, and acquires said print image data from said print image data generating section and transmits said print image data to said printing device.

20. The computer according to claim 19 further comprising:
a switching section that switches said dual-use mode and said read-only mode in said storage medium read/write device control section.

21. The computer according to claim 20 further comprising:
a storage medium loading information acquiring section that acquires, from said storage medium read/write device, storage medium loading information about whether said storage medium has been set or not; and
a prohibiting section that judges from said storage medium loading information whether said storage medium has been set or not, and prohibits a change between said dual-mode and said read-only mode in said switching section when said storage medium has been set.

22. A printing system comprising:
a data acquiring device for acquiring original image data;
a computer that acquires said original image data from said data acquiring device and generates print image data by image processing of said original image; and
a printing device that receives said print image data from said computer and prints said print image data,
wherein said computer is capable of recognizing said data acquiring device and said printing device as independent devices, said data acquiring device and said printing device are held in a common housing case, and said data acquiring device and said printing device each hold identification information indicating that they are held in the common housing case.

23. The printing system according to claim 22 wherein said data acquiring device and said printing device held in a common housing have a common serial number, and said serial number is used as said identification information.

24. A recording medium readable by a computer to which multifunction printers are connected, each of said multifunctional printers having a data acquiring device for acquiring image data and a printing device for printing image data, held in a common housing, said computer recognizing said data acquiring devices and said printing devices of said multifunction printers, independently, a program stored in said recording medium comprising:
acquiring original image data from one of said data acquiring devices;
executing image processing of said image data and thereby generating print image data that can be printed by one of said printing devices;
transmitting said print image data to one of said printing device;
realizing a number of said data acquiring devices connected to the computer; and
realizing a number of said data printing devices and other data printing connected to the computer.

25. A recording medium that can be read by a computer to which a multifunction printer is connected, said multifunction printer having a data acquiring device for acquiring image data and a printing device for printing image data both held in a common housing case, said multifunction printer holding identification information indicating that said data acquiring device and said printing device are held in a common housing case, said computer being capable of recognizing said data acquiring device and said printing device as independent devices, a program stored in said recording medium comprising:
acquiring, from said data acquiring device, data acquiring device identification information enabling distinction of said data acquiring device from other such data acquiring devices;
acquiring, from said printing device, printing device identification information enabling distinction of said printing device from other such printing devices; and
comparing said data acquiring device identification information with said printing device identification information, and thereby judging whether both these devices are held in a common housing or not.

26. The multifunction printer according to claim 1, wherein said original image data is RGB-based data, and said print image data is YMC-based data.

27. The multifunction printer according to claim 1, wherein said original image data is expressed by multi-value data representing a plurality of tones for each pixel, and said print image data is expressed by multi-value data for each pixel, the number of values of said print image data is less than that of said original image data.

28. The multifunction printer according to claim 1, wherein said data acquiring device holds data acquiring device identification information with which a computer distinguishes said data acquiring device from any other data acquiring device, and transmits said data acquiring device identification information to said computer in response to a request therefrom, and
wherein said printing device holds printing device identification information with which a computer distinguishes said printing device from any other printing device, and transmits said printing device identification information to said computer in response to a request therefrom.

29. The multifunction printer according to claim 1, wherein said data acquiring device is a storage medium read-out device capable of removably setting a storage medium storing said original image data, and said original image data is acquired by reading said storage medium.

30. The multifunction printer according to claim 1, wherein said data acquiring device is an optical image read-out device that optically reads paper representing an original image, and said original image data is acquiring by optically reading paper representing said original image.

31. A computer system, comprising:
a computer having a data acquiring device control section, a print image data generating section, and a printing device control section;
one or more data acquiring devices and one or more printing devices coupled to the computer, wherein one of the data acquiring devices and one of the printing devices are commonly housed together in a multifunction printer, the computer independently recognizing the data acquiring devices and the printing devices;
the data acquiring device control section controlling the data acquiring devices, and being adapted to acquire original image data therefrom;
the print image data generating section generating print image data corresponding to the acquired original image data; and
the printing device control section controlling the printing devices, and being adapted to transmit the print image data thereto;
wherein:
the data acquiring device control section, and not the print image data generating section, manages a number of the one or more data acquiring devices; and
the print image data generating section, and not the printing device control section, manages a number of the one or more printing devices.

32. The computer system according to claim 31 wherein:
each data acquiring device holds respective data acquiring device identification information distinguishing the data acquiring device from any of other data acquiring devices, and each printing device holds respective printing device identification information distinguishing the printing device from any of other printing devices;
the print image data generating section sends to the data acquiring device control section a request, for the data acquiring device identification information, without specifying the data acquiring device; and
the print image data generating section sends to the printing machine control section a request, for the printing device identification information, specifying the printing device.

33. The computer system according to claim 31, wherein the print image data generating section converts the acquired original image data made up of RGB-based data into the print image data made up of YMC-based data.

34. The computer according to claim 31, wherein the print image data generating section converts the acquired original image data expressed by multi-value data indicating a plurality of tones for each pixel, into the print image data expressed by multi-value data for each pixel, the number of values of the print image data is less than that of the acquired original image data.

35. The computer according to claim 31, wherein one of the data acquiring devices is a storage medium read-out device adapted to set a storage medium for storing the original image data.

36. The computer according to claim 31, wherein one of the data acquiring devices is an optical image read-out device adapted to optically read paper representing an original image.

37. The multifunction printer according to claim 1, wherein the common housing case is a computer casing.

* * * * *

UNITED STATES PATENT AND TRADEMARK OFFICE
CERTIFICATE OF CORRECTION

PATENT NO. : 6,947,171 B1 Page 1 of 1
APPLICATION NO. : 09/670722
DATED : September 20, 2005
INVENTOR(S) : Hideyuki Narusawa and Masakatsu Endo It is certified that error appears in the above-identified patent and that said Letters Patent is hereby corrected as shown below:

On title page
In the "(*) Notice" section, please delete --This patent is subject to a terminal disclaimer--

Signed and Sealed this

Eighteenth Day of March, 2008

JON W. DUDAS
*Director of the United States Patent and Trademark Office*